US010453079B2

(12) United States Patent
Bodden

(10) Patent No.: US 10,453,079 B2
(45) Date of Patent: Oct. 22, 2019

(54) METHOD, COMPUTER-READABLE STORAGE DEVICE, AND APPARATUS FOR ANALYZING TEXT MESSAGES

(71) Applicant: AT&T Intellectual Property I, L.P., Atlanta, GA (US)

(72) Inventor: Christopher David Bodden, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 731 days.

(21) Appl. No.: 14/085,667

(22) Filed: Nov. 20, 2013

(65) Prior Publication Data

US 2015/0142510 A1    May 21, 2015

(51) Int. Cl.
*G06Q 10/00* (2012.01)
*G06Q 30/02* (2012.01)
*H04W 4/14* (2009.01)

(52) U.S. Cl.
CPC .......... *G06Q 30/0201* (2013.01); *H04W 4/14* (2013.01)

(58) Field of Classification Search
None
See application file for complete search history.

(56) References Cited

U.S. PATENT DOCUMENTS

| | | |
|---|---|---|
| 7,130,777 B2 | 10/2006 | Garg et al. |
| 7,185,065 B1 | 2/2007 | Holtzman et al. |
| 7,603,415 B1 | 10/2009 | Mcerlean |
| 7,788,087 B2 | 8/2010 | Corston-oliver et al. |
| 7,930,302 B2 | 4/2011 | Bandaru et al. |
| 7,953,219 B2 | 5/2011 | Freedman et al. |
| 7,987,188 B2 | 7/2011 | Neylon et al. |
| 8,136,034 B2 | 3/2012 | Stanton et al. |
| 8,200,477 B2 | 6/2012 | Yi et al. |
| 8,204,884 B2 | 6/2012 | Freedman et al. |
| 8,239,189 B2 | 8/2012 | Skubacz et al. |
| 8,280,885 B2 | 10/2012 | Cardie et al. |
| 8,296,168 B2 | 10/2012 | Subrahmanian et al. |
| 8,412,530 B2 * | 4/2013 | Pereg ............... G06F 17/279 704/270 |
| 8,412,650 B2 | 4/2013 | Takamatsu |
| 8,417,713 B1 * | 4/2013 | Blair-Goldensohn ........ G06F 16/335 707/751 |
| 8,463,594 B2 | 6/2013 | Au |

(Continued)

OTHER PUBLICATIONS

Lau, JayHam, On-Line Trend Analysis with Topic Models: #twitter trends detection topic model online, Dec. 2012, COLING 2012, p. 1-16.*

(Continued)

*Primary Examiner* — Joseph M Waesco

(57) ABSTRACT

A method, computer-readable storage device and apparatus for analyzing text messages are disclosed. For example, the method receives the text messages, tokenizes each one of the text messages to extract a token, identifies the token as trending, wherein trending comprises the token having a frequency above a threshold, classifies a sentiment for each one of the text messages having the token that is identified as trending, identifies a demographic for the sentiment of the token that is trending, and provides the demographic and the sentiment of the token that is trending to a third party entity associated with the token.

20 Claims, 3 Drawing Sheets

(56) References Cited

U.S. PATENT DOCUMENTS

| | | | |
|---|---|---|---|
| 8,463,606 B2 | 6/2013 | Scott et al. | |
| 8,554,701 B1 | 10/2013 | Dillard et al. | |
| 2004/0172272 A1 | 9/2004 | Shillinglaw et al. | |
| 2006/0069589 A1* | 3/2006 | Nigam | G06F 17/274 706/55 |
| 2008/0004053 A1 | 1/2008 | Kim et al. | |
| 2008/0133488 A1* | 6/2008 | Bandaru | G06F 16/951 |
| 2008/0249764 A1 | 10/2008 | Huang et al. | |
| 2009/0044246 A1* | 2/2009 | Sheehan | H04N 21/2221 725/146 |
| 2009/0157948 A1* | 6/2009 | Trichina | G06F 12/0246 711/103 |
| 2009/0209235 A1* | 8/2009 | Lawler | H04L 51/38 455/413 |
| 2009/0248399 A1* | 10/2009 | Au | G06F 17/27 704/9 |
| 2009/0265307 A1 | 10/2009 | Reisman et al. | |
| 2009/0306967 A1* | 12/2009 | Nicolov | G06F 17/2785 704/9 |
| 2009/0319518 A1* | 12/2009 | Koudas | G06F 16/951 |
| 2010/0312769 A1* | 12/2010 | Bailey | G06F 16/95 707/740 |
| 2010/0332287 A1* | 12/2010 | Gates | G06F 17/277 705/7.32 |
| 2012/0046936 A1* | 2/2012 | Kandekar | G06Q 30/0282 704/9 |
| 2012/0101952 A1* | 4/2012 | Raleigh | G06Q 30/016 705/304 |
| 2012/0259616 A1* | 10/2012 | Peng | G06F 17/274 704/9 |
| 2012/0278064 A1 | 11/2012 | Leary et al. | |
| 2013/0124192 A1* | 5/2013 | Lindmark | G06F 17/274 704/9 |
| 2013/0282362 A1* | 10/2013 | Taylor | G06F 17/274 704/9 |
| 2013/0290317 A1* | 10/2013 | Spivack | G06F 17/275 707/723 |
| 2013/0311485 A1* | 11/2013 | Khan | G06F 17/2785 707/748 |
| 2014/0149177 A1* | 5/2014 | Frank | G06Q 10/06 705/7.29 |
| 2014/0180788 A1* | 6/2014 | George | G06Q 30/0269 705/14.41 |

OTHER PUBLICATIONS

Tobias Gunter and Lenz Furrer. "GU-MLT-LT: Sentiment Analysis of Short Messages using Linguistic Features and Stochastic Gradient Descent." http://www.newdesign.aclweb.org/anthology/S/S13/S13-2054.pdf.

Jain, Harshit, Aditya Mogadala, and Vasudeva Varma. "sielers: Feature Analysis and Polarity Classification of Expressions from Twitter and SMS Data." http://www.aclweb.org/anthology/S/S13/S13-2087.pdf.

Wang, Zhilei, et al. "Analysis of Public Sentiment Based on SMS Content." Trustworthy Computing and Services. Springer Berlin Heidelberg, 2013. 637-643. http://www.sciencedirect.com/science/article/pii/S0957417411012449.

Chambers, Lorraine, et al. "Mobile sentiment analysis." (2012). http://eprints.port.ac.uk/8162/1/k12gen-092.pdf.

Hangal, Sudheendra, and M. Lam. "Sentiment Analysis on Personal Email Archives." Proceedings of the 24th annual ACM symposium on User interface software and technology. 2011. http://mobisocial.stanford.edu/papers/informatics11.pdf.

Mahmoud, Tarek M., and Ahmed M. Mahfouz. "SMS spam filtering technique based on artificial immune system." IJCSI International Journal of Computer Science Issues 9.1 (2012). http://ijcsi.org/papers/IJCSI-9-2-1-589-597.pdf.

Gomez Hidalgo, Jose Maria, et al. "Content based SMS spam filtering." Proceedings of the 2006 ACM symposium on Document engineering. ACM, 2006. http://citeseerx.ist.psu.edu/viewdoc/download?doi=10.1.1.63.7578&rep=rep1&type=pdf.

\* cited by examiner

300

METHOD, COMPUTER-READABLE STORAGE DEVICE, AND APPARATUS FOR ANALYZING TEXT MESSAGES

BACKGROUND

Currently, trend analysis can be performed on messages posted on social media websites such as Facebook® or Twitter®, social media review websites such as Yelp® or TripAdvisor®, web searching sites such as Google® and Yahoo!®, and the like. A company may be willing to analyze these messages posted by users to detect trends in the comments that may be related to the company. However, these social media websites may only represent a small portion of the population since many users have decided not to create a subscription or profile for these websites such as Facebook®, Twitter®, Yelp®, TripAdvisor®, and the like.

SUMMARY

In one embodiment, the present disclosure provides a method, computer-readable storage device, and an apparatus for analyzing text messages. In one embodiment, the method receives the text messages, tokenizes each one of the text messages to extract a token, identifies the token as trending, wherein trending comprises the token having a frequency above a threshold, classifies a sentiment for each one of the text messages having the token that is identified as trending, identifies a demographic for the sentiment of the token that is trending, and provides the demographic and the sentiment of the token that is trending to a third party entity associated with the token.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for analyzing text messages. As discussed above, trend analysis can be performed on messages posted on social media websites such as Facebook® or Twitter®, social media review websites such as Yelp® or TripAdvisor®, web searching sites such as Google® and Yahoo!®, and the like. However, these social media websites may only represent a small portion of the population since many users have decided not to create a subscription or profile for these websites.

However, communication network service providers have access to stored text messages sent between subscribers of the service provider. For example, cellular communication services and mobile endpoint devices associated with the cellular communication services are more ubiquitous and widely used than social media websites. In addition, due to the relationships between users who send text messages to one another, the text messages may be more honest or forthright as to how an individual feels about various topics, services and/or products.

In one embodiment of the present disclosure, a service provider may analyze the text messages sent across the service provider's communication network and provide a trending analysis and sentiment analysis of various topics identified from the text messages. This information may be provided to third party entities (e.g., corporations or businesses) that are interested in obtaining such valuable information. In addition, the service provider may have demographic and/or relationship information of the subscribers who are sending text messages to one another that can be used for targeting advertisements, sales or marketing strategies for the third party entities.

Figure 1:
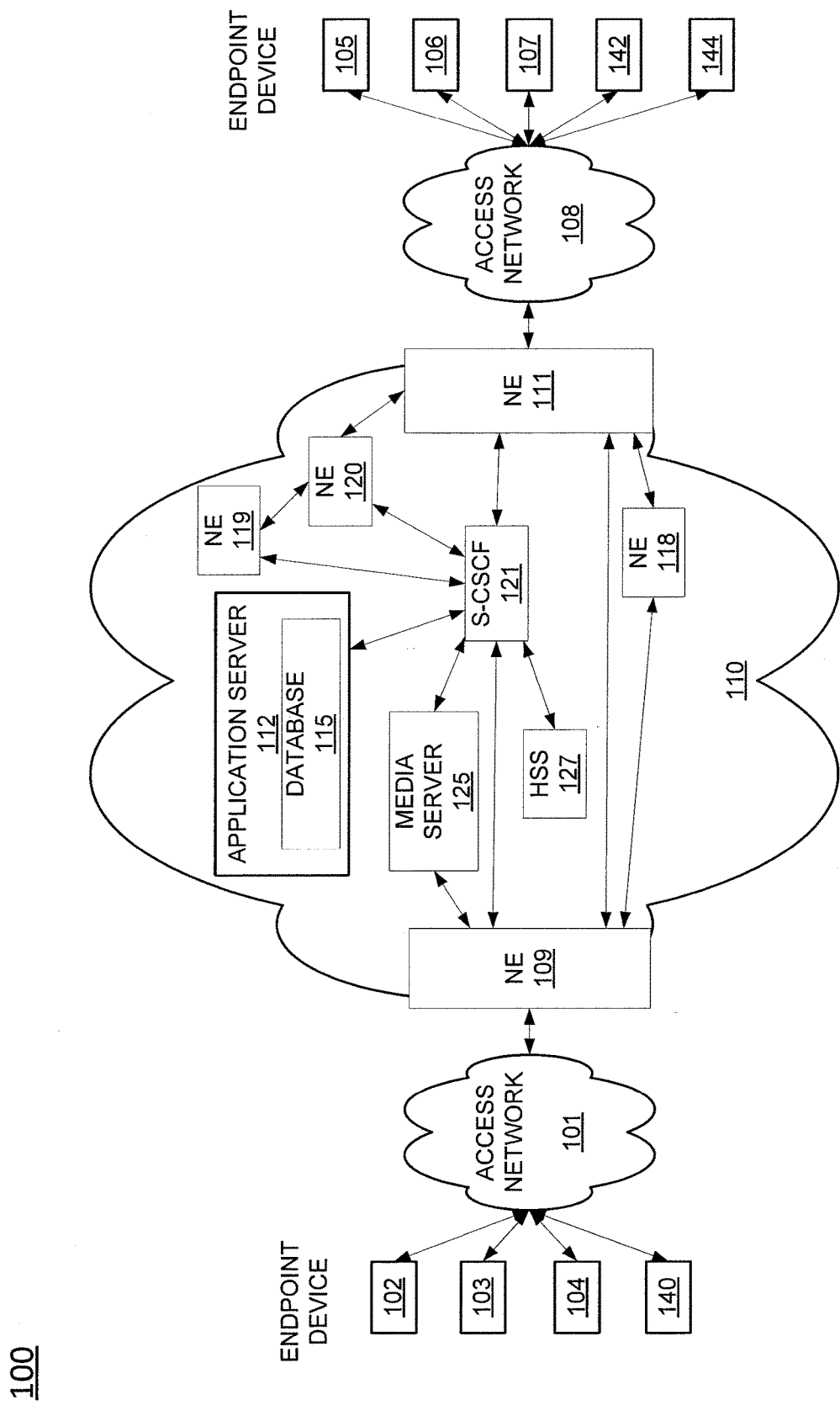
FIG. 1 illustrates one example of a communications network of the present disclosure.

FIG. 1 is a block diagram depicting one example of a communication network 100, e.g., an IP network such as an Internet Protocol (IP) Multimedia Subsystem (IMS) network related to the current disclosure. It should be noted that an IP network is broadly defined as a network that uses Internet Protocol to exchange data packets. Additional exemplary Internet protocol (IP) networks include Voice over Internet Protocol (VoIP) networks, Service over Internet Protocol (SoIP) networks, and the like.

In one embodiment, the network 100 may comprise a plurality of endpoint devices 102-104 configured for communication with a core IMS network 110 (e.g., an IP based core backbone network supported by a service provider) via an access network 101. In addition, a plurality of endpoint devices 105-107 is configured for communication with the IMS core packet network 110 via an access network 108. The network elements 109 and 111 may serve as gateway servers or edge routers for the network 110.

In one embodiment, the endpoint devices 102-107 may comprise mobile customer endpoint devices such as wireless telephones, cellular phones smart phones, laptop computers, computing tablets, Personal Digital Assistants (PDAs), and the like that are capable of sending text messages via the core IMS network 110. In one embodiment, text messages may include short message service (SMS) text messages, multi-media messaging service (MMS) messages, instant messages and the like.

The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a cellular access network (e.g., a 2G network, a 3G network, a 4G network, a long term evolution (LTE) network and the like), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server (AS) 112 that contains a database (DB) 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF 121 may also interrogate an HSS 127 to retrieve authorization, service information, user profiles, etc. In order to complete a call that requires certain service specific features, the S-CSCF 121 may need to interact with various application servers (e.g. various VoIP servers). For example, the S-CSCF 121 may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server 125 also interacts with customers for media session management to accomplish tasks such as process requests.

The AS 112 may comprise any server or computer, and the DB 115 may be any type of electronic collection of data. In one embodiment, the DB 115 may store various dictionaries or libraries needed for tokenizing and/or classifying the tokens extracted from the text messages that are analyzed. In one embodiment, the DB 115 may also store the text messages, subscriber information and subscription information (e.g., if the subscriber is on a family plan or a corporate plan and the relationship between the subscriber and other subscribers within those group plans).

In one embodiment, the AS 112 may be used to perform the analysis of the text messages and other functions described herein. In addition, one or more AS 112 may be included in the communication network 100. It should be recognized that the communication network 100 may be expanded by including additional endpoint devices, access networks, network elements, application servers, etc. without altering the scope of the present disclosure.

In one embodiment, the communication network 100 may also include one or more third party entities 140, 142 and 144. Although three third party entities are illustrated in FIG. 1, it should be noted that any number of third party entities may be deployed. In one embodiment, the third party entities 140, 142 and 144 may be subscribers to the service provider of the communications network 100 to obtain information based upon the text message analysis. For example, the third party entities 140, 142 and 144 may be corporations or businesses that are willing to subscribe to a service with the service provider to obtain trending information extracted from the text message analysis, such as for example, trends and sentiment of products or services that the third party entities 140, 142 and 144 sell, demographic or relationship information about groups or people or individuals having the identified sentiment of the products or services that the third party entities 140, 142 and 144 sell, and the like.

The above communication network 100 is described to provide an illustrative environment in which packets for voice, data, text messages and multimedia services are transmitted on networks. The communication network 100 has also been simplified and may include other network elements that are not described herein, such as firewalls, routers, switches, border elements, gateways, and the like. The current disclosure discloses a method, computer-readable storage device, and apparatus for analyzing text messages that are sent using an example network illustrated in FIG. 1 and as described above.

Figure 2:
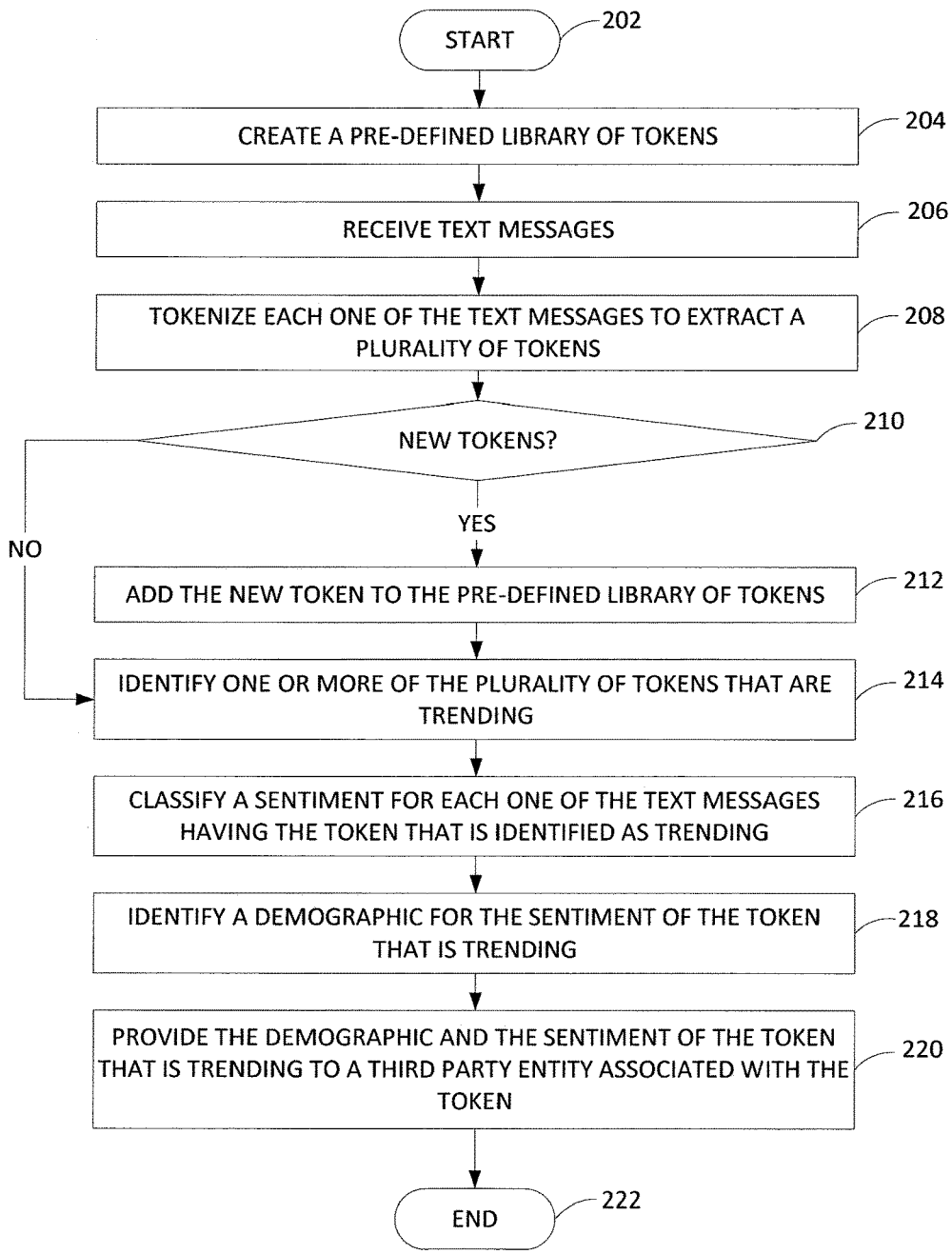
FIG. 2 illustrates an example flowchart of a method for analyzing text messages.
Figure 3:
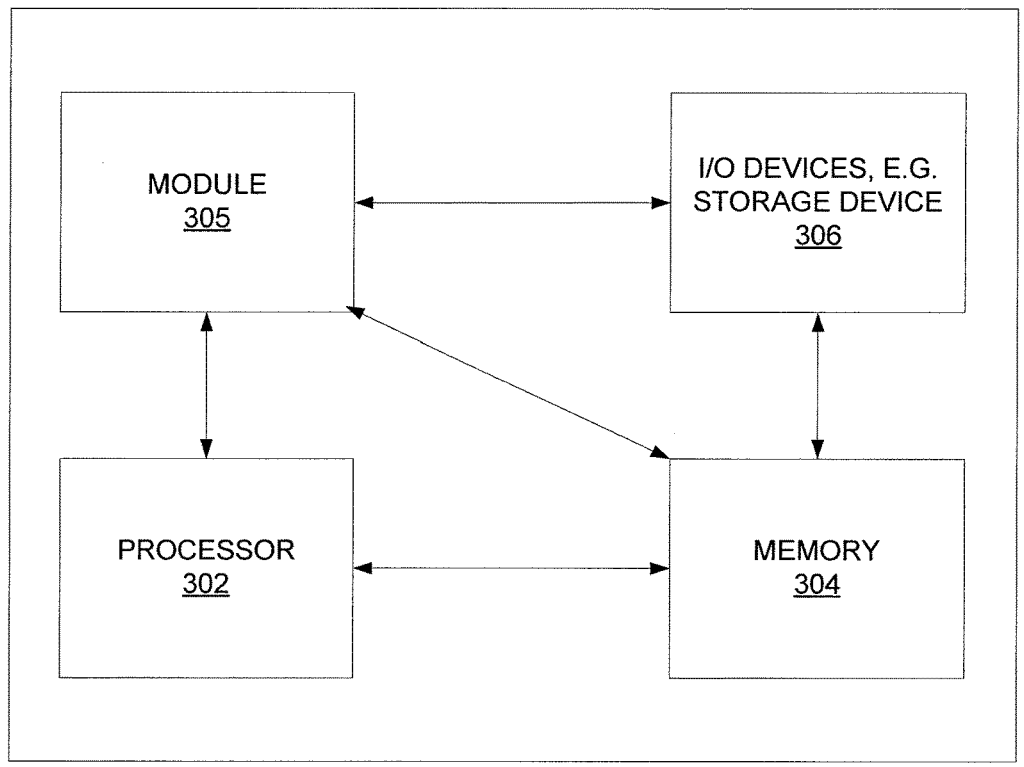
FIG. 3 illustrates a high-level block diagram of a general-purpose computer suitable for use in performing the functions described herein.

FIG. 2 illustrates a flowchart of a method 200 for analyzing text messages. In one embodiment, the method 200 may be performed by the AS 112 or a general purpose computer as illustrated in FIG. 3 and discussed below.

The method 200 begins at step 202. At step 204, the method 200 may create a pre-defined library of tokens. In one embodiment, the pre-defined library may be a learning library that may be continually updated with new tokens that are identified.

At step 206, the method 200 may receive text messages. In one embodiment, the text messages may be received from a database that stores each text message that is sent across a service provider's communication network. In one embodiment, the text messages may be SMS messages or MMS messages.

At step 208, the method 200 tokenizes each one of the text messages to extract a plurality of tokens (broadly one or more tokens). For example one or more tokens may be extracted from each one of the text messages to obtain a total plurality of tokens. In one embodiment, a token may be defined as a key word that is obtained from the text message. In one embodiment, the tokens may be only related to a product or a service that is sold or provided by a corporation, company or business. In one embodiment, any tokenizing algorithm may be performed by applying a natural language processor. Some specific examples may include U-Tokenizer, RoboVerdict and the like.

The tokens may then be compared to the pre-defined library to confirm that a potential token is a token. In other words, any potential token that matches an entry in the pre-defined library may be considered to be a token. As noted above, the present disclosure may only be interested in finding tokens related to products or services that are sold or produced by a company. For example, an enterprise customer of the communication network service provider may assist in crafting the pertinent tokens related to the enterprise customer's business. Thus, the pre-defined library may only include tokens or key words associated with specific products or services.

At step 210, the method may determine if any new tokens are identified. For example, if any of the potential tokens extracted from the text messages are not found in the pre-defined library, the potential token may be a new token. If no new tokens are extracted, the method 200 may proceed to step 214.

However, if new tokens are extracted, the method 200 may proceed to step 212. At step 212, the method 200 may add the new token to the pre-defined library of tokens. For example, the new token may be associated with a new product or service that is released by a company that was not previously found in the pre-defined library of tokens and may be added.

At step 214, the method 200 may identify one or more of the plurality of tokens that are trending. For example, each one of the plurality of tokens that is extracted from the text messages may be binned. For example, similar tokens may be placed in a common bin (e.g., all tokens related to iPhone® may be placed in one bin, all tokens related to Android® may be placed in another bin, all tokens related to Playstation® 4 may be placed in another bin, and so forth). The frequency of each token in the bins may be tracked over a period of time (e.g., 1 hour, 1 day, 1 week, 1 month, and the like).

A token may be identified as trending when the frequency of the token exceeds a threshold (e.g., greater than 100 tokens in a bin). In one embodiment, the frequency of the token may be required to exceed the threshold within the period of time that the token is tracked (e.g., greater than 1000 tokens in a bin in one week).

At step 216, the method 200 may classify a sentiment for each one of the text messages having a token that is identified as trending. For example, within a bin containing the token "iPhone®", each one of the text messages that include the token "iPhone®" may be analyzed to classify an individual sentiment of the text message. In one embodiment, any classifying algorithm may be used, such as for example, a K nearest Neighbors algorithm, a Naive Bayes classifier, and the like.

After each one of the text messages is classified, the total number of individual sentiments can be quantified to classify an overall sentiment for the token that is trending. For example, for the token "iPhone®" that is identified as trending, 75% of the text messages may be classified as having an individual sentiment that is positive, 20% of the text messages may be classified as having an individual sentiment that is negative and 5% of the text messages may be classified as having an individual sentiment that is neutral. Since the positive individual sentiment has the highest percentage, the overall sentiment of the token "iPhone®" can then be classified as positive.

In one embodiment, the sentiment classification may be repeated for each one of the tokens that is identified as trending. in another embodiment, the sentiment classification may be repeated for all tokens that are extracted from the text messages regardless of whether a token is trending or not trending.

At step 218, the method 200 may identify a demographic for the sentiment of the token that is trending. For example, the service provider of the communication network may have access to subscription information and subscriber information of each subscriber that sends a text message across the service provider's communication network. Thus, the service provider may use the subscriber information and the subscription information to identify demographic information (e.g., gender, age, geographic location or region, relationship and the like). In one embodiment, the step 218 may be repeated for each one of the tokens that has been identified with a sentiment.

For example, the service provider may collect data that 90% of the positive sentiment text messages having the token "iPhone®" are from subscribers between the ages of 17-25. The service provider may collect data that 75% of the negative sentiment text messages having the token "iPhone®" are from subscribers over the age 60. In another example, the service provider may collect data that 80% of the negative sentiment text messages are from subscribers located in the south.

In one embodiment, the demographic information may be more detailed down to a relationship level. For example, the service providers may know a relationship between a sending subscriber and a recipient subscriber of the text messages via a group plan offered by the service provider. For example, the group plans may include a family plan (e.g., parent to children relation, spouse to spouse relationship, and the like) or a corporate plan (e.g., employer to employee relationship, supervisor to employee relationship, employee to a particular department or business unit relationship, and the like). For example, the service provider may know that 33% of the positive sentiment text messages having the token "iPhone®" are from a wife to a husband based upon the husband and wife's subscription to a family plan. In another example, the service provider may know that 33% of the positive sentiment text messages having the token "iPhone®" are from an employee to a higher level employee based on the employee and higher level employee's subscription to a corporate plan. In another example, the service provider may know that 33% of the positive sentiment text messages having the token "iPhone®" are between employees of a particular business unit or department, e.g., a sales department, a customer service department, an engineering department, an accounting department, and the like.

In one embodiment, once the demographic is identified for the sentiment of the token that is trending and stored, any information related to an identification of the sender and the recipient is removed from the tokens and/or text messages that are analyzed. This will help to maintain the privacy of the subscribers.

At step 220, the method 200 may provide the demographic and the sentiment of the token that is trending to a third party entity associated with the token. In one embodiment, the third party entity (e.g., an enterprise customer) may pay a subscription fee to the service provider of the communication network for a subscription to be provided with demographic and the sentiment associated with one or more tokens that are trending (e.g., upward or downward). In one embodiment, the third party entity may be a corporation, a company or a business that sells or provides a product or service.

Using the example described above in step 218, the demographic and sentiment information may be valuable to a third party entity. For example Apple® may be willing to pay a subscription fee for the information indicating that 75% of the negative sentiment text messages having the token "iPhone®" are from subscribers over the age 60. For example, this may be an indication that older subscribers are not comfortable with the iPhone® and require more marketing and training to change this negative sentiment associated with the demographic of older subscribers.

In another example, Apple® may want to pay for the information indicating that 33% of the positive sentiment text messages having the token "iPhone®" are from an employee to a higher level employee. For example, this may indicate that a particular company is discussing the iPhone® based upon the relationship identified from the corporate subscription plan associated with the employee and the higher level employee, which may mean that an opportunity could be available for Apple® to market against the company to switch to a corporate cellular plan that features the iPhone®. In fact, the positive sentiment could be extended to possibly as being a positive sentiment of other products manufactured by Apple®.

In other words, by identifying a token that is trending, the third party entity may be informed that the company's product is being followed or talked about frequently. In addition, the sentiment of the token may inform the third party entity whether the discussion about the company's product is overall positive or overall negative. Finally, the demographic information associated with the sentiment may help the third party entity focus on which group of subscribers requiring more marketing or help for improving the overall sentiment of the company's product or service.

In one embodiment, the demographic and sentiment may be provided in a list by one or more various categories as described above in step 218. For example, the percentage of positive, negative or neutral sentiments may be listed for different demographics such as age, gender, industry, race, region, family members, company employees, and the like. At step 222, the method 200 ends.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for analyzing text messages, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for analyzing text messages (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for analyzing text messages (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for analyzing text messages, the method comprising:

receiving, by a processor of a telecommunication service provider, over a communication network of the telecommunication service provider, the text messages;

storing, by the processor, to a memory, the text messages;

tokenizing, by the processor, each one of the text messages to extract a token, wherein the token relates to a product or a service of a third party entity;

identifying, by the processor, the token as trending, wherein the trending comprises the token having a frequency of occurrence in the text messages within a period of time that is above a threshold;

classifying, by the processor in response to the identifying the token as trending, a sentiment for each one of the text messages having the token that is identified as trending, wherein the sentiment is classified using a naive bayes classifier;

identifying, by the processor, a demographic for each one of the text messages having the token that is identified as trending, wherein the demographic comprises a relationship type between a sender and a recipient of each one of the text messages having the sentiment of the token that is identified as trending, wherein the demographic is determined from subscriber information of the telecommunication service provider, wherein the relationship type is identified based upon a group subscription plan subscribed to by the sender and the recipient, wherein the relationship type is at least one of: a parent to children relationship, a spouse to spouse relationship, an employer to employee relationship, a supervisor to employee relationship, or an employee to a particular department or business unit relationship;

removing, by the processor, information related to an identity of the sender and an identity of the recipient from each one of the text messages having the token that is identified as trending in response to the identifying the demographic;

generating, by the processor, an overall sentiment for the token that is identified as trending; and providing, by the processor, the overall sentiment, or the demographic and the sentiment for each one of the text messages having the token that is identified as trending to an endpoint device of the third party entity associated with the token, wherein the demographic and the sentiment of the token that is identified as trending are presented in a list based on the relationship type for allowing the third party entity to distinguish the sentiment of the product or the service with respect to family members and company employees.

2. The method of claim 1, wherein the tokenizing comprises:

applying, by the processor, a natural language processor to identify a potential token in each of the text messages; and comparing, by the processor, the potential token to a pre-defined library to confirm that the potential token is the token.

3. The method of claim 1, wherein the sentiment comprises a positive sentiment.

4. The method of claim 1, wherein the sentiment comprises a negative sentiment.

5. The method of claim 1, wherein the generating the overall sentiment comprises a comparison of a percentage of positive sentiments versus a percentage of negative sentiments of the text messages having the token that is identified as trending.

6. The method of claim 1, wherein the group subscription plan comprises a family plan.

7. The method of claim 1, wherein the group subscription plan comprises a corporate plan.

8. The method of claim 1, wherein the third party entity pays for a subscription to be provided with the demographic and the sentiment of the token that is identified as trending.

9. A non-transitory computer-readable storage device storing a plurality of instructions which, when executed by a processor of a telecommunication service provider, cause the processor to perform operations for analyzing text messages, the operations comprising:

receiving, over a communication network of the telecommunication service provider, the text messages;

storing, by the processor, to a memory, the text messages;

tokenizing each one of the text messages to extract a token, wherein the token relates to a product or a service of a third party entity;

identifying the token as trending, wherein the trending comprises the token having a frequency of occurrence in the text messages within a period of time that is above a threshold;

classifying, in response to the identifying the token as trending, a sentiment for each one of the text messages having the token that is identified as trending, wherein the sentiment is classified using a naive bayes classifier;

identifying a demographic for each one of the text messages having the token that is identified as trending, wherein the demographic comprises a relationship type between a sender and a recipient of each one of the text messages having the sentiment of the token that is identified as trending, wherein the demographic is determined from subscriber information of the telecommunication service provider, wherein the relationship type is identified based upon a group subscription plan subscribed to by the sender and the recipient, wherein the relationship type is at least one of: a parent to children relationship, a spouse to spouse relationship, an employer to employee relationship, a supervisor to employee relationship, or an employee to a particular department or business unit relationship;

removing information related to an identity of the sender and an identity of the recipient from each one of the text messages having the token that is identified as trending in response to the identifying the demographic;

generating an overall sentiment for the token that is identified as trending; and providing the overall sentiment, or the demographic and the sentiment for each one of the text messages having the token that is identified as trending to an endpoint device of the third party entity associated with the token, wherein the demographic and the sentiment of the token that is identified as trending are presented in a list based on the relationship type for allowing the third party entity to distinguish the sentiment of the product or the service with respect to family members and company employees.

10. The non-transitory computer-readable storage device of claim 9, wherein the tokenizing comprises:

applying a natural language processor to identify a potential token in each of the text messages; and comparing the potential token to a pre-defined library to confirm that the potential token is the token.

11. The non-transitory computer-readable storage device of claim 9, wherein the generating the overall sentiment comprises a comparison of a percentage of positive sentiments versus a percentage of negative sentiments of the text messages having the token that is identified as trending.

12. The non-transitory computer-readable storage device of claim 9, wherein the third party entity pays for a subscription to be provided with the demographic and the sentiment of the token that is trending.

13. An apparatus for analyzing text messages, the apparatus comprising:

a processor of a telecommunication service provider; and a computer-readable storage device storing a plurality of instructions which, when executed by the processor, cause the processor to perform operations, the operations comprising:

receiving, over a communication network of the telecommunication service provider, the text messages;

storing, to a memory, the text messages;

tokenizing each one of the text messages to extract a token, wherein the token relates to a product or a service of a third party entity;

identifying the token as trending, wherein the trending comprises the token having a frequency of occurrence in the text messages within a period of time that is above a threshold;

classifying, in response to the identifying the token as trending, a sentiment for each one of the text messages having the token that is identified as trending, wherein the sentiment is classified using a naive bayes classifier;

identifying a demographic for each one of the text messages having the token that is identified as trending, wherein the demographic comprises a relationship type between a sender and a recipient of each one of the text messages having the sentiment of the token that is identified as trending, wherein the demographic is determined from subscriber information of the telecommunication service provider, wherein the relationship type is identified based upon a group subscription plan subscribed to by the sender and the recipient, wherein the relationship type is at least one of: a parent to children relationship, a spouse to spouse relationship, an employer to employee relationship, a supervisor to employee relationship, or an employee to a particular department or business unit relationship;

removing information related to an identity of the sender and an identity of the recipient from each one of the text messages having of the token that is identified as trending in response to the identifying the demographic;

generating an overall sentiment for the token that is identified as trending; and providing the overall sentiment, or the demographic and the sentiment for each one of the text messages having the token that is identified as trending to an endpoint device of the third party entity associated with the token, wherein the demographic and the sentiment of the token that is identified as trending are presented in a list based on the relationship type for allowing the third party entity to distinguish the sentiment of the product or the service with respect to family members and company employees.

14. The apparatus of claim 13, wherein the tokenizing comprises:
applying a natural language processor to identify a potential token in each of the text messages; and
comparing the potential token to a pre-defined library to confirm that the potential token is the token.

15. The apparatus of claim 13, wherein the sentiment comprises a positive sentiment.

16. The apparatus of claim 13, wherein the sentiment comprises a negative sentiment.

17. The apparatus of claim 13, wherein the generating the overall sentiment comprises a comparison of a percentage of positive sentiments versus a percentage of negative sentiments of the text messages having the token that is identified as trending.

18. The apparatus of claim 13, wherein the group subscription plan comprises a family plan.

19. The apparatus of claim 13, wherein the group subscription plan comprises a corporate plan.

20. The apparatus of claim 13, wherein the third party entity pays for a subscription to be provided with the demographic and the sentiment of the token that is identified as trending.

* * * * *